Figure 1:
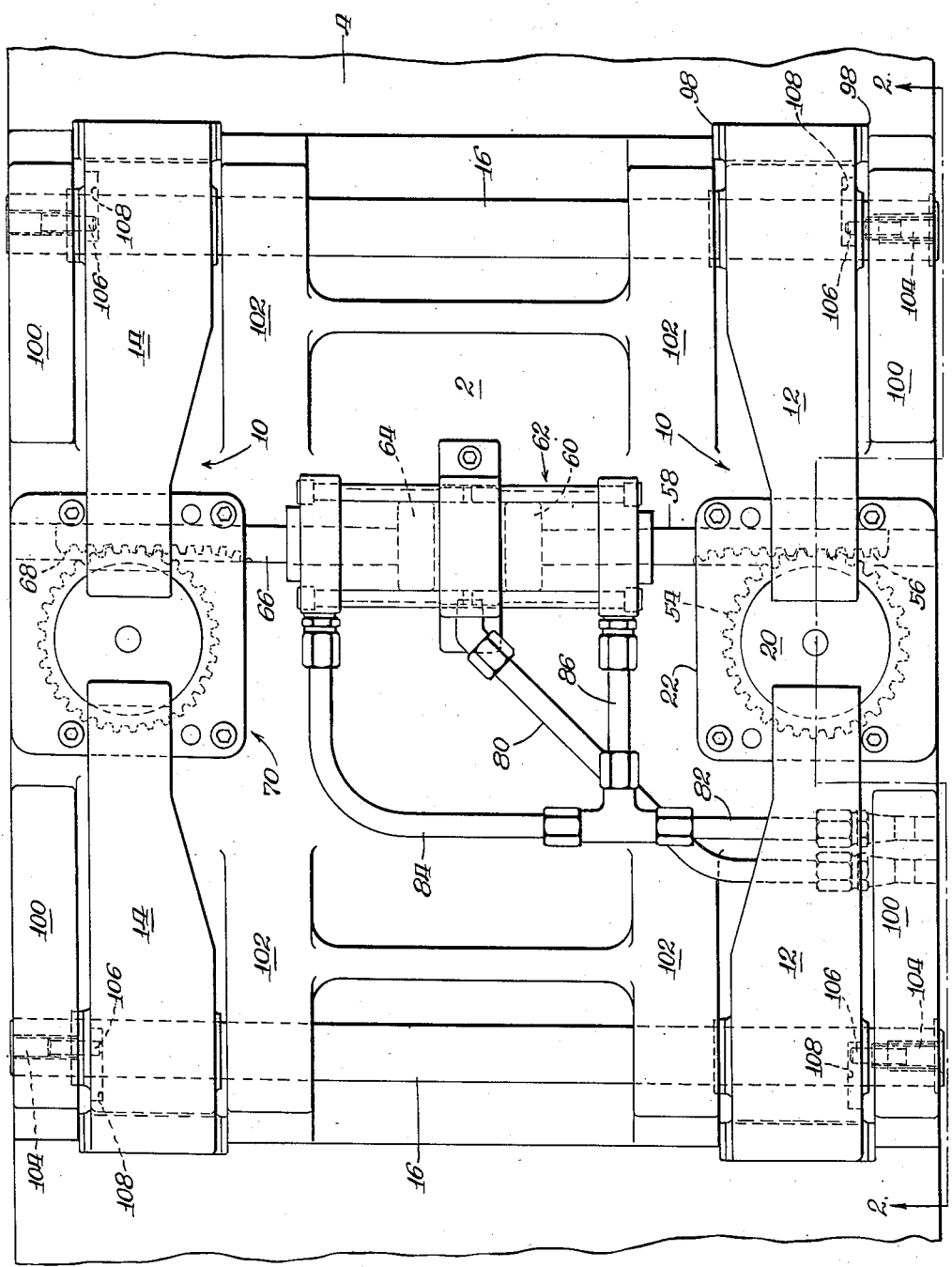

April 22, 1958   W. T. HAKE   2,831,236
POWER CLAMPING UNIT
Filed Dec. 6, 1954   2 Sheets-Sheet 1

Witness:
Neil J. Driscoll

INVENTOR.
Walter T. Hake
BY
Walter L. Schlegel, Jr.   Atty.

April 22, 1958 W. T. HAKE 2,831,236
POWER CLAMPING UNIT
Filed Dec. 6, 1954 2 Sheets-Sheet 2
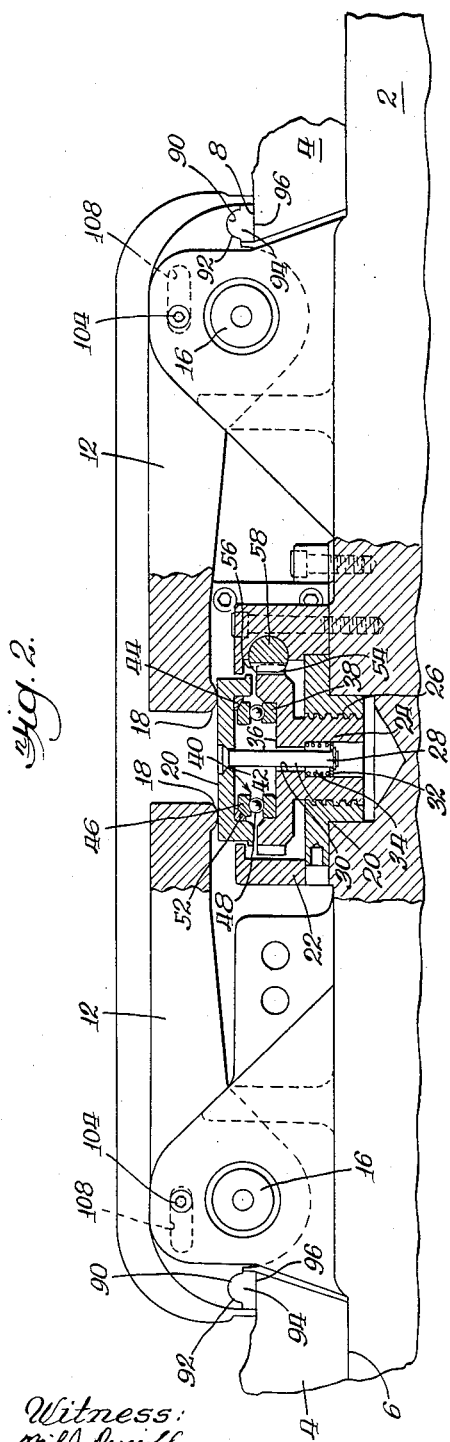
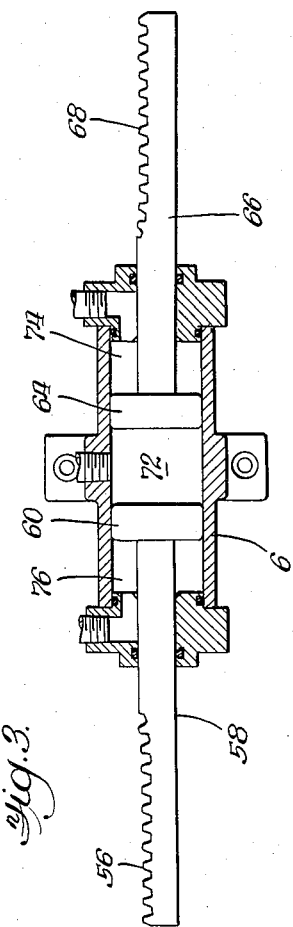
INVENTOR.
Walter T. Hake
BY
Walter L. Schlegel, Jr. Atty.
Witness:
Neil J. Dusoll

United States Patent Office 2,831,236
Patented Apr. 22, 1958

2,831,236

POWER CLAMPING UNIT

Walter T. Hake, Cincinnati, Ohio, assignor to American Steel Foundries, Chicago, Ill., a corporation of New Jersey Application December 6, 1954, Serial No. 473,143

12 Claims. (Cl. 29—1)

The invention relates to vertical boring mills and particularly to a unique clamping arrangement utilized on said mill or similar machine whereby a movable member is locked in a fixed position on a supporting member.

As will be well understood by those skilled in the art and familiar with metal turning machines, particularly that type of machine known as a boring mill, a vertically movable rail is mounted and carried on upright columns of the mill and is movable vertically on ways formed on said column whereby a rail carried cutting tool may be moved toward and away from a table mounted work piece. The tool is carried on the rail in a ram head or the like, said ram head having a mechanism associated therewith whereby the tool may be moved in a plurality of directions relative to the table mounted work piece. The rail, therefore, serves as a base or base support for the operating tool as it moves across the work piece to cut therein a desired shape or contour. With this in mind, it will be readily understood that it is not only desirable but necessary that the base rail be fixedly locked in a determined position whereby it may offer rigid non-moving support for the tool to insure accurate machining. To obtain this rigid support, it has been a practice in the art to provide the rail with a clamping device whereby the rail is securely fastened to the rail supporting columns. It has been common in the art to provide such clamping arrangements whereby the rail is secured to the columns, said arrangements usually being electrically operated and comprising a pair of movable jaws to engage a rail bearing face on the column whereby the rail is clamped between the front supporting ways and the rear bearing faces. These clamping arrangements have been operated through mechanical linkage arrangements. In these devices, it has been an ever present problem to maintain accurately equal clamping pressures at the individual jaws. When the pressure is not equal, it has been found that the rail was frequently forced out of square or level. This of course resulted in a faulty base from which tool movement and machining occurs.

Accordingly, it is a primary object of the invention to provide a novel clamping arrangement whereby a rail may be clamped to the columns of a vertical boring mill and equal pressure may be exerted in each clamping jaw thereby assuring that the rail will be adequately clamped without disturbing the rail level due to clamping action.

It is an additional object of the invention to provide a clamping arrangement of the type described wherein hydraulic pressure is utilized to actuate a plurality of clamping jaws and assure equal clamping pressures between a plurality of pairs of clamping jaws.

It is a particular object of the invention to provide a novel arrangement whereby equal clamping pressure may be exerted on each lever within a particular pair of clamping jaws.

These and other objects of the invention will become apparent in the course of the following description and from an examination of the concerned drawings, wherein:

Figure 1 is a fragmentary rear elevational view of a rail utilized on a vertical boring mill, and illustrating the particular clamping structure employed, Figure 2 is a sectional view taken along lines 2—2 of Figure 1, and Figure 3 is a detailed view of the novel power actuator employed in the invention.

It will be understood that certain features of construction may be omitted from various views where it is believed such features will more clearly and adequately be shown in other figures.

Describing the invention in detail, a rail is fragmentarily and generally indicated at 2, said rail being mounted on the front side of vertical columns 4, 4, said columns being attached to a base or bed structure (not shown), as will be well understood by those familiar with a vertical boring mill.

The faces of the columns, as at 6, 6, are accurately machined to provide ways which offer guidable support for the carried horizontal rail 2. The rear portions of the columns are also machined as at 8, 8 to provide vertical inner column bearing surfaces upon which the clamping arrangement may act, as will be hereinafter more fully described.

Directing attention to Figure 1, it will be seen that at the rear side of the rail 2 intermediate the columns 4, 4, there is provided a clamping arrangement, indicated generally at 10. The clamping arrangement comprises two pairs of horizontally arranged clamping arms or levers 12, 12 and 14, 14. The levers 12 are pivotally mounted as at 16 adjacent the outboard extremity of each lever. At the inboard extremity of the arms 12, it will be seen that the arm ends are arranged adjacent each other, both of said arms having spherical contacting surfaces 18, 18 engaging the upper surface of an actuating member 20. The actuating member is movably mounted within a housing 22, said housing being fixedly bolted to the rear face of the rail 2. Internally of the housing 22 an operating member or element 24 is located, said element 24 being threadably associated as at 26 with a portion of the housing 22 and rail 2. A retaining pin 28 is disposed in a central bore 30 of the member 24 and is provided with a demountable head 32 on the lower end thereof which is engaged by a spring 34 whereby the pin 28 and its connected operating member 20 is maintained in assembled relationship with the operating element 24. The operating element 24 is provided with a flat surfaced cavity 36, said cavity mounting and carrying the lower race 38 of a pressure thrust bearing indicated generally at 40. The actuating element 20 is also provided with a flat surfaced cavity 42 which abuts a thrust element 44. An upper race 46 is arranged to directly engage the thrust element 44, said upper race 46 being operatively associated with the lower race 38 by means of a plurality of intervening balls 48, as will be well understood by those familiar with bearing arrangements.

It will be particularly noted that the lower race 38, the upper race 46 and the thrust element 44 are circular when seen in top view and that the surface 52 which offers contact between the upper race 46 and the thrust element 44 is arcuate as seen in the cross sectional view of Figure 2, whereby the surface 52 is spherical when considered three dimensionally.

The actuating element 24 is provided with a plurality of gear teeth 54 peripherally formed on the outside thereof. The gear teeth 54 are operatively connected to a gear rack 56 formed on the piston rod 58, said piston rod having at the inner end thereof a piston 60 which is disposed in a hydraulic operating cylinder 62. The cylinder is additionally provided with another piston 64 at the opposite end thereof, said other piston 64 having another piston rod 66 extending therefrom with a gear rack 68 formed thereon. The gear rack 68 is operatively engaged with an actuating mechanism 70 at the upper end of the rail as will be seen in Figure 1, and it will be understood that the actuating mechanism 70 is identical with the lower actuating mechanism above described and illustrated in detail in Figure 2.

The pistons 60 and 64 divide the actuating cylinder 62 into a plurality of chambers 72, 74 and 76. The chamber 72 is located centrally of the cylinder and intermediate both pistons while the chambers 74 and 76 are on the outboard sides of the pistons. A source of hydraulic fluid, such as a conventional motor-pump arrangement (not shown), may be provided and conventional oil piping, such as line 80 and line 82, may be arranged to carry oil or other hydraulic fluid under pressure to the respective chambers. The line 80 is arranged to carry hydraulic fluid to the central chamber 72 while the line 82 is bifurcated to provide separate pipes 84 and 86 to carry hydraulic fluid to the chambers 74 and 76, respectively. It will be understood that as hydraulic fluid under pressure is admitted to the chamber 72 via the line 80, the pistons 60 and 64 will be forced outwardly causing an outward movement of the connected piston rods. Additionally, as oil is admitted to line 82, it is then carried to the chambers 74 and 76 whereby the pistons 60 and 64 are urged inwardly of the cylinder moving their connected piston rods inwardly and forcing hydraulic fluid to drain through line 80.

Directing attention again to Figure 2, it will be seen that each arm 12, 12 is provided with a semi-cylindrical cavity 90 at its outer extremity, said cavities 90 receiving semi-cylindrical or arcuate bosses 92 presented by pressure shoes 94. A flat front face 96, 96 is provided on each pressure shoe 94, said front face being engageable with the bearing surface 8 formed on the rear of the related column 4. Retaining caps 98, 98 may be mounted on the upper and lower edges (as seen in Figure 1) of the levers 12 to retain the pressure shoes 94 in position on the ends of the arm. The retaining caps 98 may be secured to the levers by any conventional means such as tack welding or by means of screws. The caps have been eliminated entirely from Figure 2 to more clearly illustrate the pressure shoe structure. It will be particularly noted that these caps and the complementally arcuate engagement between the bosses 92 annd the cavities 90 are the only means provided to retain the pressure shoes on the ends of the arms 12, thus it will be seen that the shoes are allowed a measure of free movement relative to the ends of the associated arms 12 whereby the shoes will automatically seek full surfaced flat faced engagement with the bearing surfaces on the columns during the clamping action hereinafter described. It will be noted that the pressure shoe arrangement shown and described on arms 12, 12 is identical on the upper clamp arms 14 though not illustrated in detail.

To assemble the rail to the column, it is necessary to pull the pivot pins 16 and move the arms 12 and 14 inwardly toward each other between their corresponding flanges 100 and 102 formed on the back of the rail 2. To prevent the arms from falling away from the rail, a retaining pin 104 is provided in each flange 100, said retaining pin 104 having a boss 106 on its internal end which is received in a slot 108 formed in the related arm. When the rail is mounted securely on the columns, the arms or levers 12 and 14 are again extended outwardly to overlap the column bearing surfaces 8 and the pins 16 may be reinserted to afford pivotal support for the levers.

To operate the disclosed embodiment, it is necessary to admit hydraulic fluid under pressure to the chambers 74 and 76 via the line 82. This urges the pistons inwardly whereby piston rods 58 and 68 are moved inwardly toward each other causing the gear connected actuating elements 24 to rotate. Rotation of the elements 24 on their threads 26 causes them to move upwardly as seen in Figure 2. This upward movement being transmitted to the actuating member 20 through the connecting bearing arrangement 40. Movement of the members 20 upwardly causes the clamping arms 12 and 14 to rotate about their pivots 16 whereby the pressure shoes 94 are brought into firm engagement with the bearing surfaces 8 on the rear of the columns. This causes the rail 2 to be firmly clamped to the column by the pressure at the column way surfaces 6 and the bearing surfaces 8.

It will be particularly noted that the arrangement disclosed embodies several features of construction to positively assure equal bearing pressure at all pressure shoes. In the first instance hydraulic pressure in cylinder 62 is utilized to actuate the arrangement, it being understood that the hydraulic pressure comes from a common source and hence, an equal pressure will be applied to the pistons in the cylinder 62, the pistons having equal fluid bearing areas.

Additionally, the actuating force transmitted from each element 24 to the actuating member 20 is transmitted through the bearing arrangement 40, said thrust bearing arrangement 40 being provided with the engaging spherical surfaces 52 to positively assure that equal pressure will be transmitted to the member 20 at all points thereon. Furthermore, the levers 12 and 14 have common lever arm distances from their center of pivots at 16 to the contacting bosses 18 on the inner extremity of the arms and common shorter distances from the center of pivot 16 to the center of pressure application to the pressure shoes 94 at the bosses 90. In addition, the arcuate surface engagement between the outer extremities of the arms 12 and 14 and the bosses 90 of the related pressure shoes 94 provides for a floating pressure shoe whereby forces are equally transmitted to the bearing surfaces 8 through said pressure shoes 94.

It will also be understood that in the embodiment illustrated the structure as shown as applied to a rail on one of the larger type vertical boring mills which necessitates the use of two pairs of arms 12 and 14, and that on a smaller type machine, it may be necessary to only use a single pair of clamping arms whereby the hydraulic cylinder 62 may be eliminated and another and equivalent power source be provided to actuate the element 24. Even in the smaller mills equal clamping pressure would be assured because of the particular thrust bearing 40 employed and the particular arrangement of mounting the pressure shoes.

I claim:

1. In a clamping arrangement for a machine of the type described, a pair of mounting columns, a rail movably mounted on the columns, bearing surfaces provided on the columns, a pair of clamping mechanisms pivotally mounted on the rail and having pressure means on remote ends thereof engageable with said surfaces, an actuating mechanism operatively connected to adjacent ends of said levers, said actuating mechanism comprising a moving member threadably mounted in the rail, gear teeth peripherally formed on said moving member, a linearly movable rod having a rack thereon engageable with said gear teeth, a pressure plate engaging the ends of said levers, and spherical thrust bearing means interconnecting the pressure plate and the moving member whereby upon linear movement of said rod, said moving member is urged to rotate in its threaded mounting and move said pressure plate through said thrust bearing means.

2. A clamping arrangement according to claim 1, wherein said moving member is provided with an aperture therein, a connecting pin having one end thereof attached to said plate and the other end disposed in said aperture, an abtument on said other end of said pin, and spring means compressed between said abutment and said moving member whereby said plate and said moving member are retained in assembled relationship.

3. In a clamping arrangement, a supporting member, a mounted member movably carried by said supporting member, and means to clamp said mounted member to said supporting member in any one of a plurality of desired positions, said means comprising at least two clamping levers pivotally connected to one of said members, said levers having pressure faces thereon engageable with surfaces on the other of said members, an actuating mechanism on one of said members operatively connected to said levers to urge said levers to rotate and bring said pressure faces into engagement with said surfaces, said mechanism comprising a plate member, a moving member adapted for axial and rotatable movement, a floating connection between the plate member and the moving member, a thrust bearing directly interconnecting said moving member and said plate member to transmit movement of said moving member to said plate member and to accommodate said rotatable movement, said thrust bearing having elements therein in arcuate surfaced engagement with each other.

4. In a power clamping arrangement for fixedly locking a rail to the supporting columns of a vertical boring mill, guiding ways on the front face of said column in engagement with receiving slots on said rail, a pair of clamping surfaces on the columns on the side thereof remote from said ways, said surfaces being parallel to said ways, and a clamping mechanism on the rail intermediate said columns, said clamping mechanism comprising an upper pair of clamping levers and a lower pair of clamping levers, pressure shoes movably mounted on the outboard ends of each of said levers in engageable position relative to said surfaces, an actuating mechanism associated with each pair of levers and operatively engaging the inboard ends of the related pair of levers, a power source mounted on the rail intermediate said upper and lower pairs of levers, said power source having an operative connection with each actuating mechanism, each actuating mechanism comprising a moving member threadably mounted on the rail, a lever engaging member in floating relation to said moving member, spherical thrust bearing means directly interconnecting said lever engaging member and said moving member, said power source being operative to rotate said moving member and provide said moving member with linear movement relative to its connection to the rail, said movement being transmitted to the related lever engaging member through the associated spherical thrust bearing.

5. A power clamping arrangement according to claim 4, wherein said power source comprises a hydraulic cylinder having piston rod arrangements extending from opposite sides thereof, each piston rod having a rack formed thereon, each rack having a geared connection to one of said moving members, whereby upon actuation of said power cylinder, the connected racks are urged to move thus initiating movement in said members.

6. In a clamping arrangement for the rail of a machine of the type described; a pair of supporting columns; guiding ways engaging the rail on one side of said columns; bearing surfaces on the columns on a side thereof remote from said first mentioned side; clamping means on the rail comprising a plurality of clamping levers pivotally connected to the rail intermediate their ends, certain ends of said levers having pressure means thereon engageable with said surfaces; actuating means engaging the other ends of said levers operative to pivot said levers and bring said pressure means into tight engagement with said surfaces, said actuating means comprising a lever engaging member and an axially moving member, said moving member being threadably mounted in the rail; thrust bearing means operatively interconnecting said lever engaging member and said moving member; and power operating means to rotate said moving member and thereby provide for axial movement thereof.

7. In a clamping arrangement for the rail of a machine of the type described; a pair of supported columns; guiding ways engaging the rail on one side of the columns; bearing surfaces on the columns on a side thereof remote from said first mentioned side; clamping means on the rail, certain ends of said clamping means having pressure means thereon engageable with said surfaces; actuating means engaging the other ends of said clamping means, said actuating means comprising a clamping means engaging member and an axially moving member, said moving member being threadably mounted in the rail; thrust bearing means operatively interconnecting said clamping means engaging member and said moving member; and power operated means to rotate said moving member and provide thereby for axial movement thereof.

8. In a clamping arrangement for the rail of a machine of the type described; a pair of supported columns; guiding ways on the column engaging the rail; bearing surfaces on the column; clamping means on the rail comprising a pair of clamping levers pivotally connected to the rail intermediate their ends, certain ends of said levers having pressure means thereon engageable with said surfaces; actuating means engaging the other ends of said levers, said actuating means comprising a lever engaging member and an axially moving member, said moving member being threadably mounted in the rail; and power operating means to rotate said moving member and provide thereby for axial movement thereof.

9. In a power clamping arrangement for fixedly locking a rail to the support columns of a vertical boring mill, a plurality of column clamping levers pivotally mounted on the rail, an actuating mechanism engaging adjacent ends of said levers, said mechanism comprising a movable member threadably mounted in the rail, whereby said member upon rotation thereof will be moved axially to impart thereby pivotal movement to said levers, and power operated means to rotate said member.

10. In a clamping arrangement for a boring mill rail, a pair of supporting columns having ways on one side thereof engaging the rail, bearing surfaces on said columns at the opposite side thereof, a pair of levers fulcrumed to the rail, shoes in arcuate face engagement with said levers and in complementary flat face engagement with respective bearing surfaces, an actuator member in spherical face engagement with said levers at their adjacent ends, an operating member having threaded engagement with the rail, a thrust bearing having a race in complementary spherical face engagement with a bearing surface of the actuator member, said bearing having another race engaged with the operating member and having a plurality of balls between said races, and means for rotating the operating member, whereby said levers develop equalized clamping pressure of said shoes against respective bearing surfaces of said columns.

11. In a power clamping arrangement for fixedly locking a rail to the support columns of a vertical boring mill, a plurality of column clamping levers pivotally mounted on the rail, an actuating mechanism engaging adjacent ends of said levers, said mechanism comprising a movable member threadably mounted in the rail, whereby said member upon rotation thereof will be moved axially to impart thereby pivotal movement to said levers, and means to rotate said member, said means comprising gear teeth on the outer periphery of said member and means including a rack operatively engageable with said gear teeth whereby linear movement of said rack will impart rotary motion and axial motion to said member.

12. In a power clamping arrangement for fixedly locking a rail to the support columns of a vertical boring mill, a plurality of column clamping levers pivotally mounted on the rail, an actuating mechanism engaging adjacent ends of said levers, said mechanism comprising a movable member threadably mounted in the rail, whereby said member upon rotation thereof will be moved axially to impart thereby pivotal movement to said levers, means to rotate said member, said means comprising gear teeth on the outer periphery of said member and means including a rack operatively engageable with said gear teeth whereby linear movement of said rack will impart rotary motion and axial motion to said member, a pressure plate interposed between said moving member and said levers, bearing means separating said plate and said member, aligned apertures in said plate and said member, a connecting pin, the upper end of said pin being received in the plate aperture and attached to the plate, the lower end of said pin being received in the member aperture and having an abutment thereon, and spring retaining means compressed between said abutment and said member whereby said plate and said member are maintained in assembled relationship.

References Cited in the file of this patent

UNITED STATES PATENTS

| | | |
|---|---|---|
| 1,454,080 | Sears | May 8, 1923 |
| 1,706,452 | Johannesmeyer | Mar. 26, 1929 |
| 1,760,639 | Gillham | May 27, 1930 |
| 1,822,692 | De Leeuw | Sept. 8, 1931 |
| 1,858,491 | Gallimore | May 17, 1932 |
| 2,325,387 | Fredrickson | July 27, 1943 |
| 2,456,741 | Schurr | Dec. 21, 1948 |